(12) United States Patent
Smith et al.

(10) Patent No.: US 11,978,169 B2
(45) Date of Patent: *May 7, 2024

(54) WRIST-STABILIZED PROJECTION CASTING

(71) Applicant: Meta Platforms Technologies, LLC, Menlo Park, CA (US)

(72) Inventors: Norah Riley Smith, Oakland, CA (US); Matthew Alan Insley, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,417

(22) Filed: Mar. 13, 2023

(65) Prior Publication Data
US 2023/0326150 A1  Oct. 12, 2023

Related U.S. Application Data

(63) Continuation of application No. 17/716,172, filed on Apr. 8, 2022, now Pat. No. 11,610,376.

(51) Int. Cl.
*G06F 3/01* (2006.01)
*G06F 3/04815* (2022.01)
*G06T 19/00* (2011.01)

(52) U.S. Cl.
CPC ............ *G06T 19/006* (2013.01); *G06F 3/011* (2013.01); *G06F 3/017* (2013.01); *G06F 3/04815* (2013.01)

(58) Field of Classification Search
CPC ........ G06T 19/006; G06F 3/011; G06F 3/017; G06F 3/04815; G06F 3/013; G06F 3/014; G06F 3/016; G06F 3/0482; G06F 3/0346; G06F 3/04842

USPC .......................................................... 345/156
See application file for complete search history.

(56) References Cited

U.S. PATENT DOCUMENTS

| | | | |
|---|---|---|---|
| 9,406,211 | B2 | 8/2016 | Sahiholnasab et al. |
| 9,763,614 | B2 | 9/2017 | Geller et al. |
| 9,767,609 | B2 | 9/2017 | Eade et al. |
| 11,327,630 | B1 | 5/2022 | Khan et al. |
| 2012/0143358 | A1 | 6/2012 | Adams et al. |
| 2013/0084805 | A1 | 4/2013 | Pasquero et al. |
| 2018/0125423 | A1 | 5/2018 | Chang et al. |
| 2018/0307303 | A1 | 10/2018 | Powderly et al. |
| 2021/0090331 | A1 | 3/2021 | Ravasz et al. |

(Continued)

*Primary Examiner* — Amare Mengistu
*Assistant Examiner* — Gloryvid Figueroa-Gibson
(74) *Attorney, Agent, or Firm* — Potomac Law Group, PLLC; Dannon G. Allbee

(57) ABSTRACT

A wrist-pose isolation system can infer a wrist pose (e.g., the user's hand position relative to her forearm) and can reduce wrist-induced jitter for projection casting in an XR environment. A user's projection cast can be determined as a combination of a "low-wrist contribution" component (e.g., a body-and-arm component) and a "high-wrist contribution" component (e.g., the pose of the wrist with respect to the arm). Using input from a gesture-tracking system, the contribution of the user's wrist pose to the user's current projection cast is calculated as a "wrist-contribution vector." A projection cast direction can be determined as the interpolation of the current low-wrist contribution component and the high-wrist contribution component. This interpolation can be performed by weighting each by a specified amount and combining them.

20 Claims, 11 Drawing Sheets

(56) References Cited

U.S. PATENT DOCUMENTS

2021/0124417 A1 4/2021 Ma
2021/0165486 A1 6/2021 Erivantcev et al.

WRIST-STABILIZED PROJECTION CASTING

CROSS-REFERENCE TO RELATED APPLICATIONS

This patent application is a continuation of U.S. patent application Ser. No. 17/716,172, filed Apr. 8, 2022, titled "Wrist-Stabilized Projection Casting," currently pending and which is incorporated herein by reference in its entirety.

TECHNICAL FIELD

The present disclosure is directed to inferring a wrist pose and reducing wrist-induced jitter for projection casting in an artificial reality (XR) environment.

BACKGROUND

Artificial reality systems map user body configurations and gestures to actions in the XR world. For example, a user points an index finger at an object to select that object for further interaction. These mappings are generally based on visual hand-tracking systems in the user's XR headset. Existing systems map the locations of the user's hands in space, including her fingertips and knuckles, but do not track the three degrees of freedom that each of her wrists provides. Systems, for example, may model the user's hands and determine a location of the base of the wrist, but not the pose of the wrist in relation to the user's forearm. Further, systems that can track a user's wrist may be inaccurate due to tracking noise and jitter that lead to inaccuracies in plotting the intended direction of the user's pointing.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
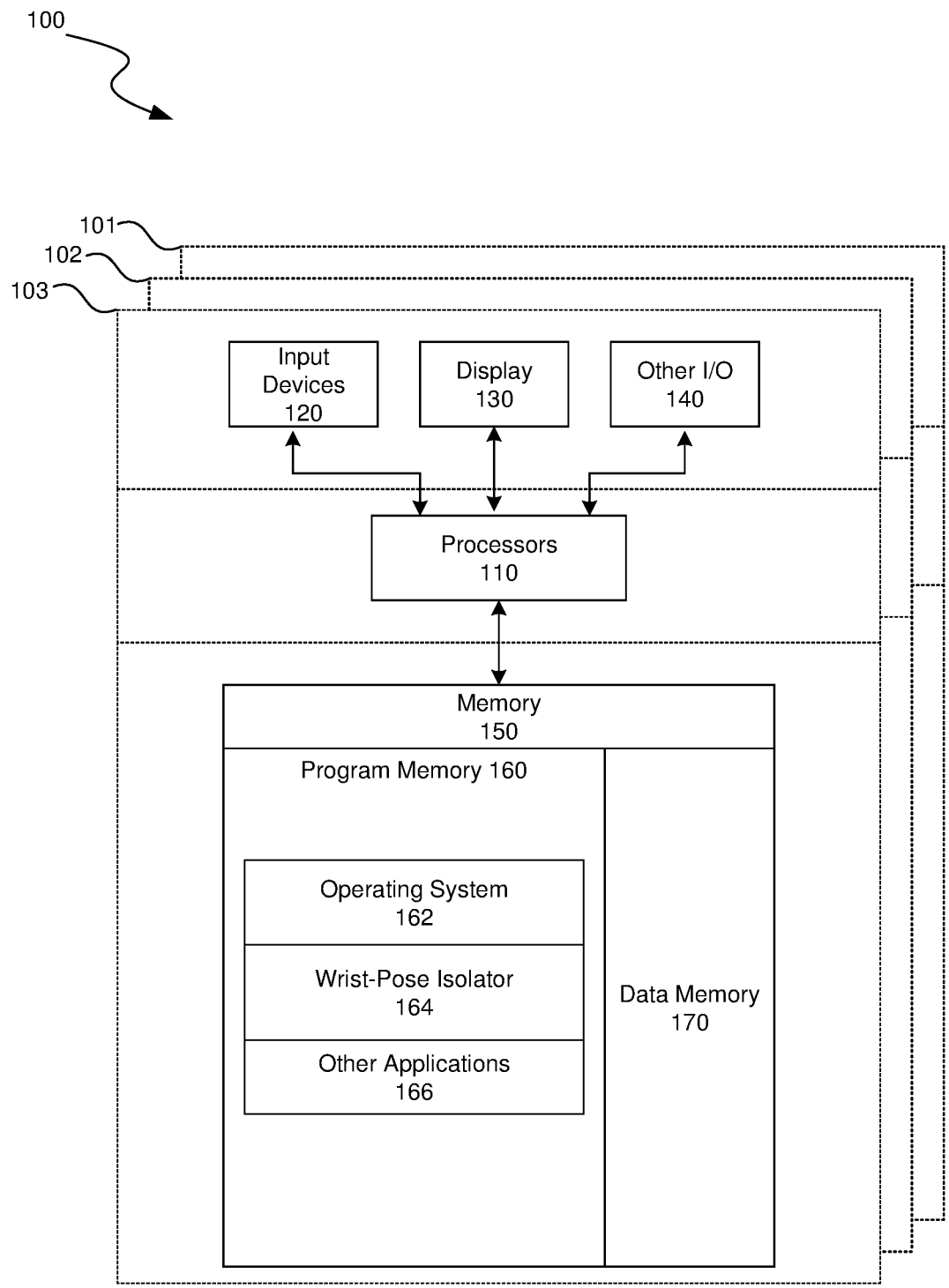
FIG. 1 is a block diagram illustrating an overview of devices on which some implementations of the present technology can operate.

Aspects of the present disclosure are directed to a wrist-pose isolation system that infers a wrist pose (i.e., position relative to the user's forearm), even where the user's forearm is not directly tracked. The inferred wrist pose can be used to control a direction of a cast ray in an artificial reality environment. In some cases, an inferred wrist pose can also or alternatively be used to improve the accuracy in systems that track a wrist pose, thereby recusing wrist-induced jitter for projection casting in an XR environment. A user's projection cast direction can be determined as a vector sum of a "low-wrist contribution" component (e.g., a body-and-arm component) and a "high-wrist contribution" component (e.g., the pose of the wrist with respect to the user's arm). Using input from a gesture-tracking system, the contribution of the user's wrist pose to the user's current projection cast is calculated as the "wrist-contribution vector." For a small amount of time or until the user moves a threshold amount after that calculation, the user's projection cast is determined as the interpolation of the user's current low-wrist contribution component and the previously calculated wrist-contribution vector instead of recalculating the user's current wrist contribution. In this manner, the wrist-pose isolator system effectively "locks" the wrist in place and thus reduces projection jitter.

The user's low-wrist contribution is calculated as a vector from a relatively stable origin point on the user's body to a "low-wrist contribution" control point on the user's arm that is not much affected by the user's wrist pose. For example, the origin point can be at the shoulder of the user's projection-casting arm, between the user's shoulder blades, or a point between the user's shoulder and hip (where the point can be chosen based on the user's gaze angle). The low-wrist contribution control point can be at the midpoint of the user's wrist where it attaches to the user's arm.

To calculate the user's current wrist-contribution vector, two rays are calculated based on a user's hand position. Ray A can be the same low-wrist contribution vector as discussed immediately above. Ray B, in contrast, is based on a high level of wrist-position contribution. Ray B can have the same origin point as Ray A or an origin point at the user's wrist, and its control point can be the user's pinch point or the tip of the user's pointing finger. When Ray A is subtracted from Ray B, the resulting delta is the wrist-contribution vector that yields the wrist position and rotation.

In some variations, the other two degrees of freedom of wrist motion, pitch and yaw, can be calculated by treating Ray A's pose as a neutral position ("forward and up") and then determining the pitch and yaw required to rotate from Ray A's pose to Ray B's forward direction.

Once calculated, the wrist-contribution vector is used for a while to determine the user's current projection cast. The user's low-wrist contribution vector can be determined as discussed above and is then interpolated with the previously calculated wrist-contribution vector. The resulting vector interpolation is used as the user's projection cast. In some implementations, the user's gaze direction (i.e., a vector connecting a user's eye to the pinch location) can further be used to compute the direction of the projection. In some cases, each of the used vectors can be weighted in the interpolating according to a contribution amount, established for each vector. As long as the calculated wrist-contribution vector is used instead of an instantaneously calculated wrist contribution, the wrist-pose isolation system effectively locks the wrist in place thus reducing wrist-induced jitter in the projection cast.

The calculated wrist-contribution vector remains current until the user moves by more than a threshold amount his origin point (e.g., by sitting down), or his low-wrist contribution control point (e.g., by moving his arm), or his high-wrist contribution control point (e.g., by significantly changing his wrist pose, by changing a pinch posture, or by changing a finger-pointing posture).

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Some existing gesture-based user interfaces do not track wrist pose (e.g., the bend of the wrist relative to the user's forearm) and others may poorly track the wrist pose, making it susceptible to wrist-induced jitter in projection casting. Systems without wrist pose tracking do not have a signal that would be useful in accurately interpreting user intentions when the user is interacting with an artificial reality environment (such as through projection casting). Users of systems that poorly track wrist pose must either carefully control their wrist movements, which is quite difficult and uncomfortable for most people, or accept a user interface that hides wrist jitter by presenting the user with a significantly worse than desirable resolution in projection casting. The wrist-pose isolation system and methods disclosed herein are expected to overcome these deficiencies in existing systems. The wrist-pose isolation system determines the user's wrist pose from the results of a gesture-tracking system. It then takes that wrist pose and uses as an input to calculate the user's projection casts. The wrist-pose isolation system can define a projection direction based on a combination of vectors, including A) a stable body-to-wrist vector (which is not greatly affected by wrist movement) and B) a body-to-pinch or wrist-to-pinch vector (which is highly dependent on wrist movement). And in some cases, the projection can further be based on C) a eye-to-pinch vector. By using the stored wrist pose instead of an instantaneously calculated wrist pose, the wrist-pose isolation system effectively locks the wrist in place and thus determines projection casts without the input of small, unintentional wrist motions. By reducing jitter, the wrist-pose isolation system reduces user discomfort and supports higher resolution gesture-based user interfaces and thus increases the utility of the systems on which it runs.

Several implementations are discussed below in more detail in reference to the figures. FIG. 1 is a block diagram illustrating an overview of devices on which some implementations of the disclosed technology can operate. The devices can comprise hardware components of a computing system 100 that damps wrist-induced jitter for projection casting. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a wrist-pose isolator 164, and other application programs 166. Memory 150 can also include data memory 170 that can include, e.g., a user's current wrist pose, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
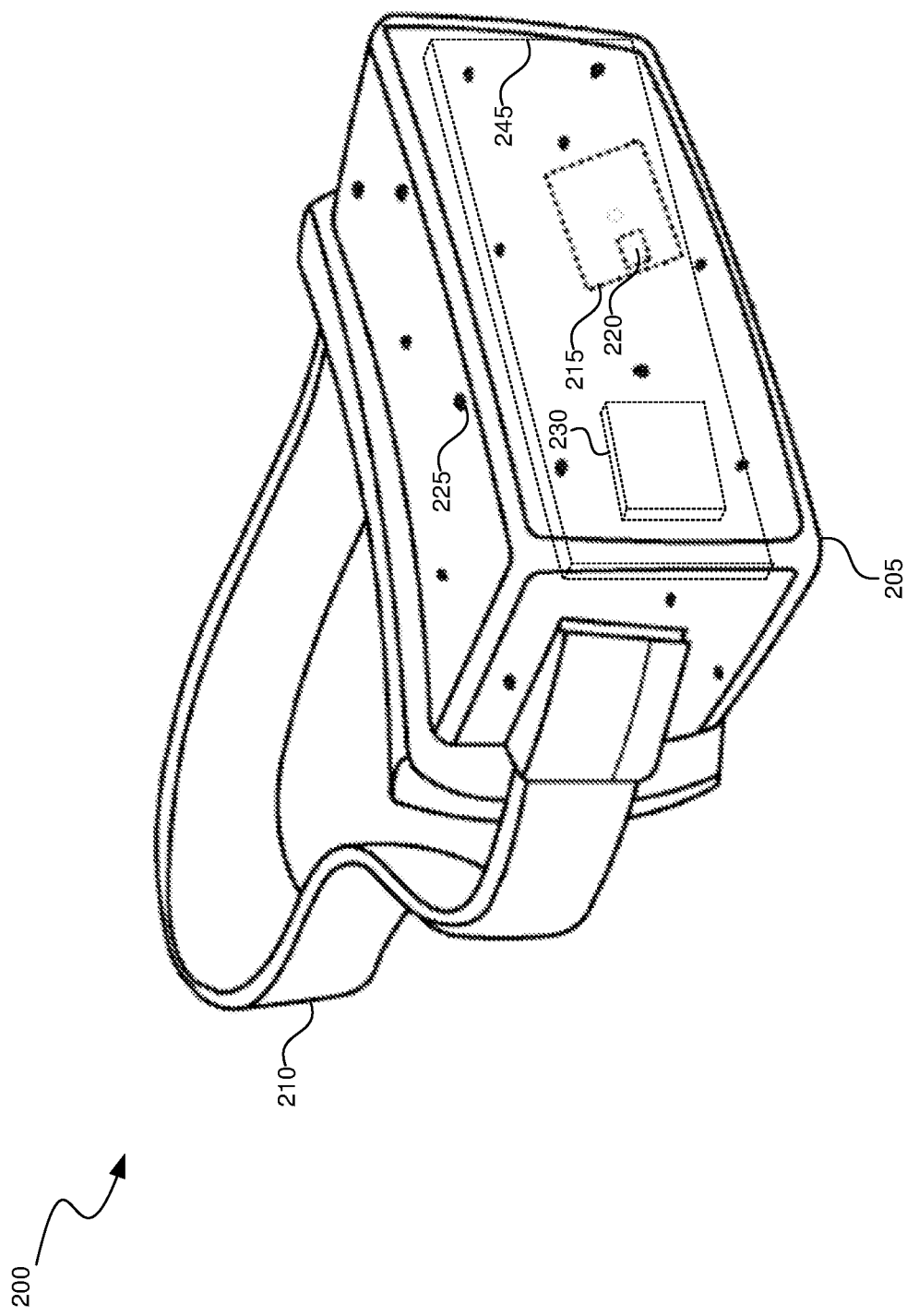
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
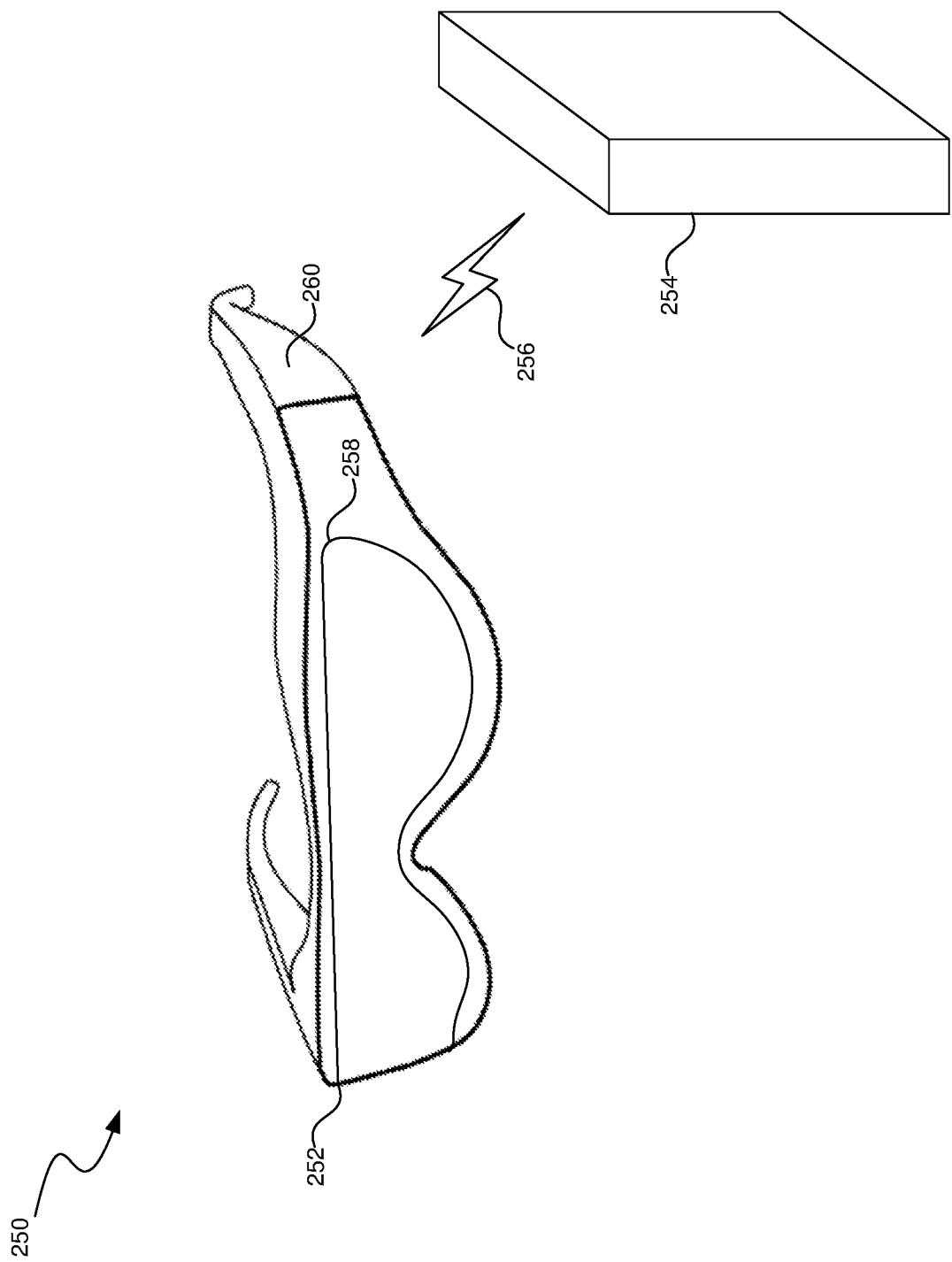
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
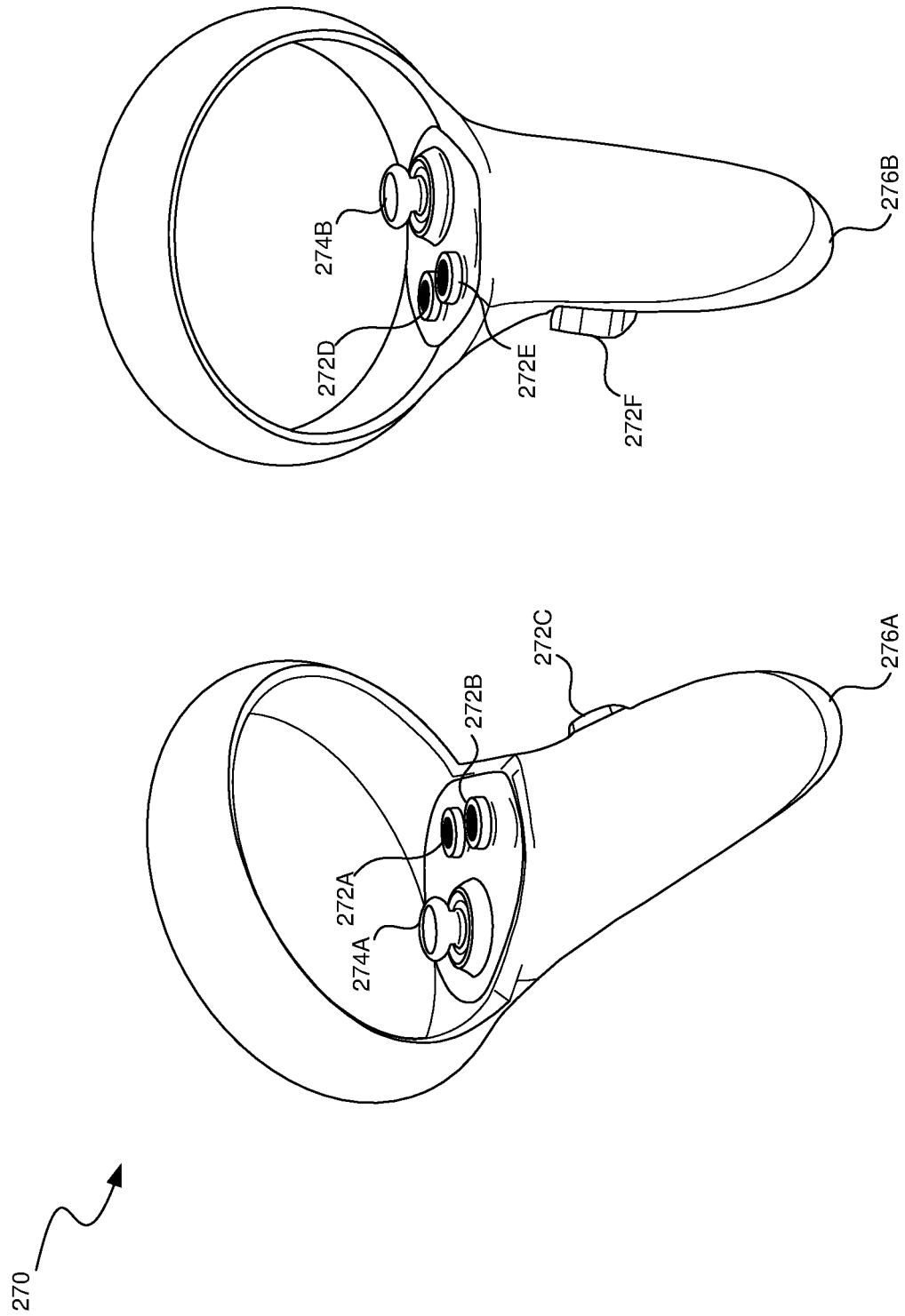
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
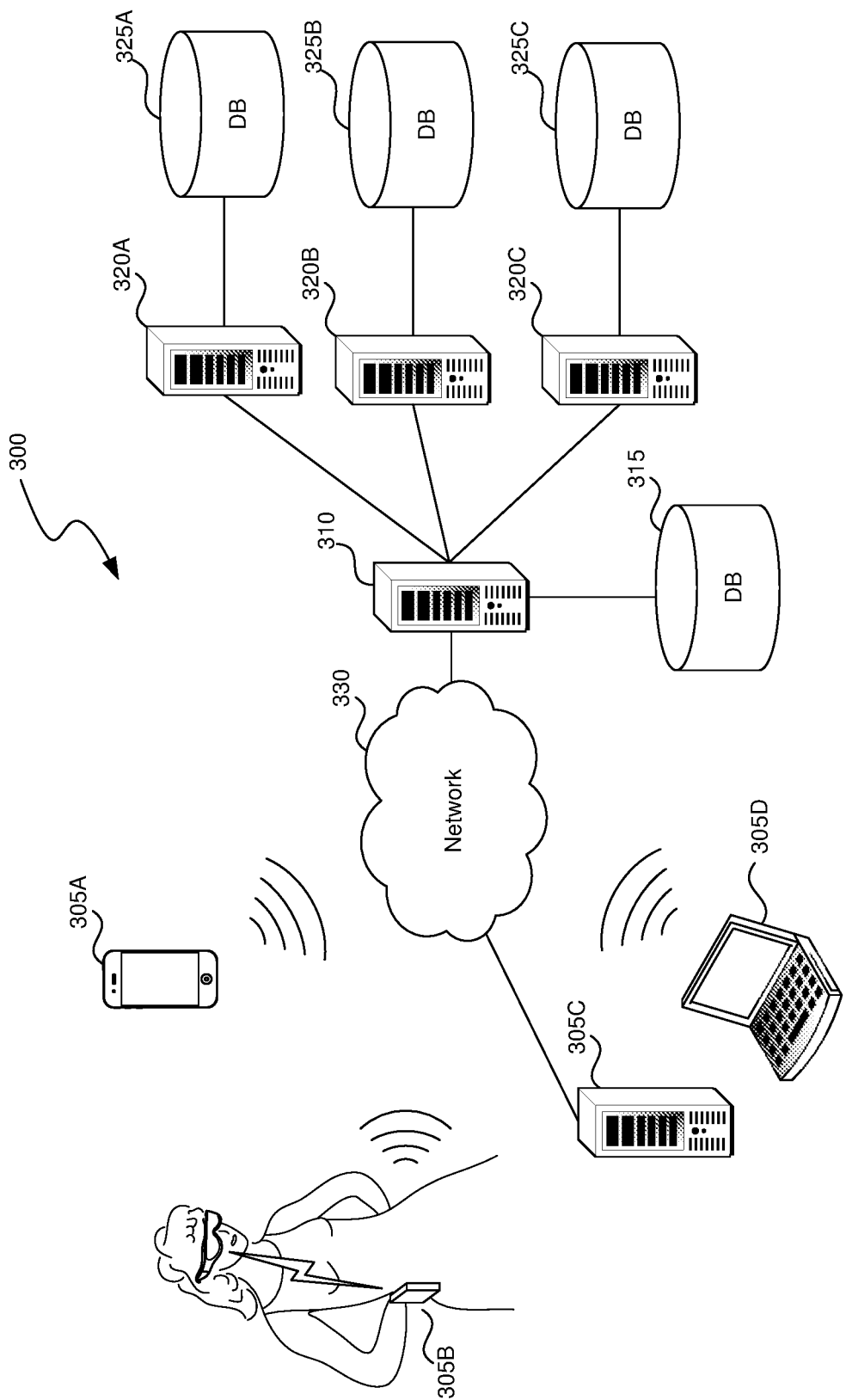
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
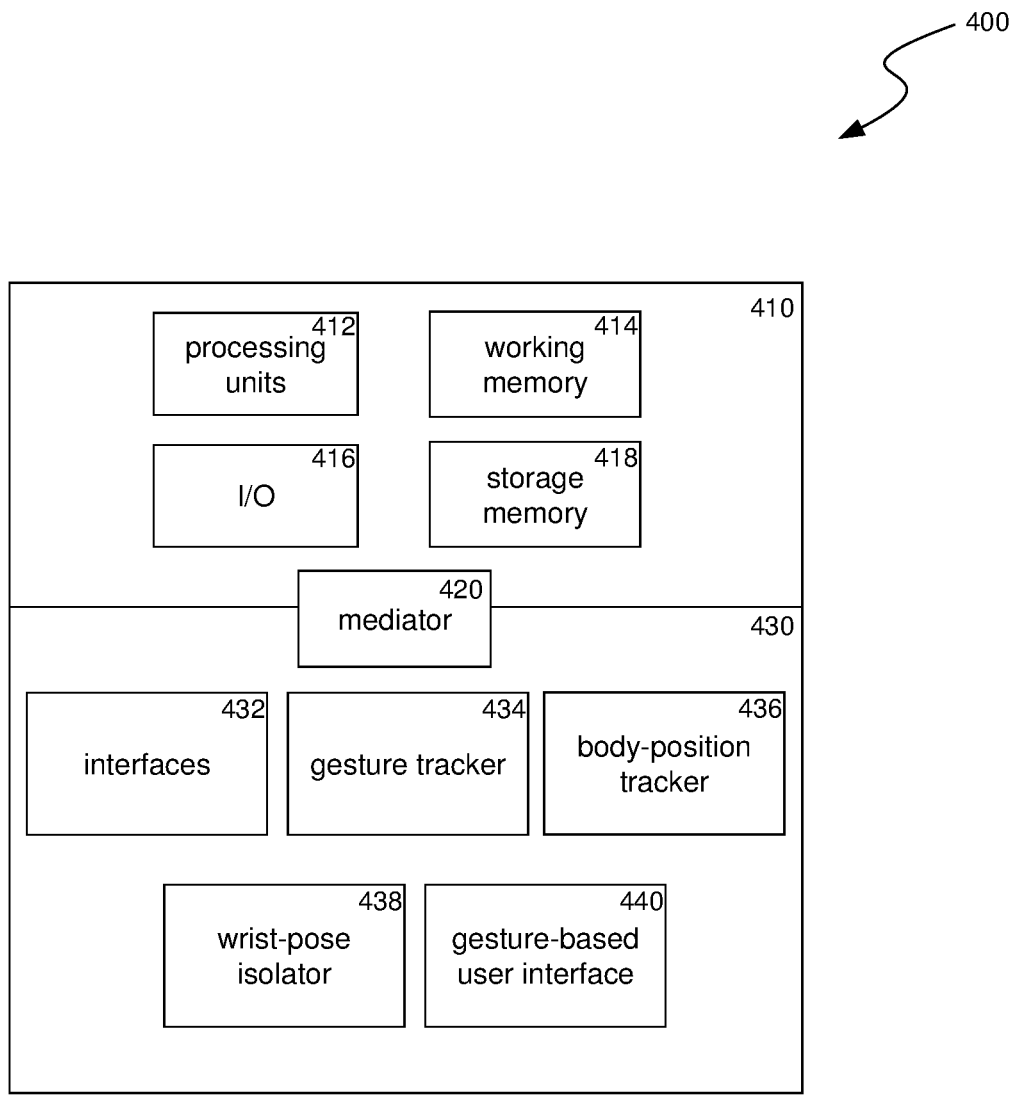
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for inferring a wrist pose and reducing wrist-induced jitter for projection casting in an XR environment. Specialized components 430 can include a gesture-tracking system 434, a body-position tracking system 436, a wrist-pose isolator system 438, a gesture-based user interface 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The gesture-tracking system 434 can determine the position and orientation in space of the user's hands and fingers. For example, the gesture-tracking system 434 can determine if a user is making a pinch or pointing gesture and can determine the projection direction of the user's gesture. Examples of this are discussed below in relation to FIGS. 8 and 9. The gesture-tracking system 434 can be implemented, as discussed above in relation to FIGS. 2A and 2B, by a user's XR system, in some variations the HMD, which can include motion- and position-tracking units, cameras, and the like, which can determine these positions and orientations in 3DoF or 6DoF.

The body-position tracking system 436 determines the position and orientation of the user's body in space. For example, the body-position tracking system 436 determines a position of an origin point on the user's body, such as at her shoulder, waste, or a point between the two. Examples of this are discussed below in relation to FIGS. 7A and 7B. In some variations, the gesture-tracking system 434 and the body-position tracking system 436 are functions of the same hardware components in the user's XR system.

The wrist-pose isolator system 438 can determine an amount of wrist bend, twist, etc., which can be used to inferring a wrist pose and/or reduce wrist-induced jitter in a user's projection casts. The wrist-pose isolator system 438 uses input from the body-position tracking system 436 and from the gesture-tracking system 434 to determine the user's "wrist pose," that is, the orientation of the wrist in 3DoF with respect to the arm. It then takes that wrist pose and uses it to cast a projection, which may include de-jittering the user's projection casts. That is, the wrist-pose isolator system 438 can subtract, from the direction (e.g., a first vector) that defines the origin point to the pinch gesture, the direction (e.g., a second vector) that defines the origin point to the base of the wrist (i.e., the base of the back of the user's hand). Thus, it can compute an amount of offset due to the rotation of the wrist. The wrist-pose isolator system 438 can use this information to infer the wrist pose as compared to the user's forearm, which can be virtually locked in place when making a projection without the input of small, unintentional wrist motions, called "jitters."

Figure 9:
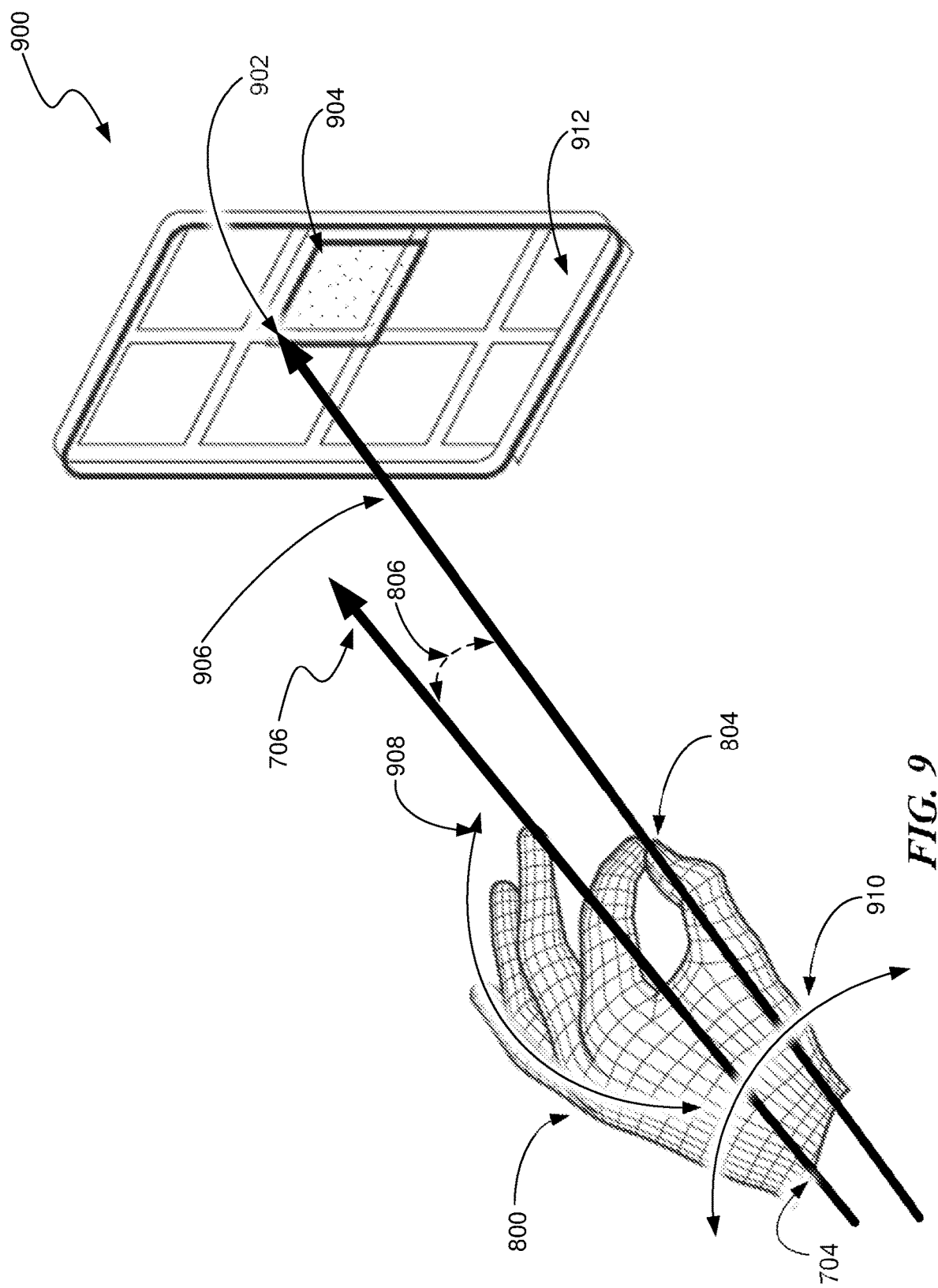
FIG. 9 is a conceptual diagram illustrating an example of combining vectors to generate a projection.

The gesture-based user interface 440 receives information from the gesture-tracking system 434 and the wrist-pose isolator system 438 to determine which object(s) the user is selecting with his projection-casting gesture. The gesture-based user interface 440 then sends interpreted user gestures to the user-selected object(s) for action. For example, the wrist-pose isolator system 438 can accurately determine the direction of the user's projection cast. When that projection cast is extrapolated, it can be intercepted by an object in the user's XR environment. That object can then be taken as the object selected by the user to be the recipient of a gesture he is currently making. FIG. 9 presents an example of the use of the gesture-based user interface 440.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
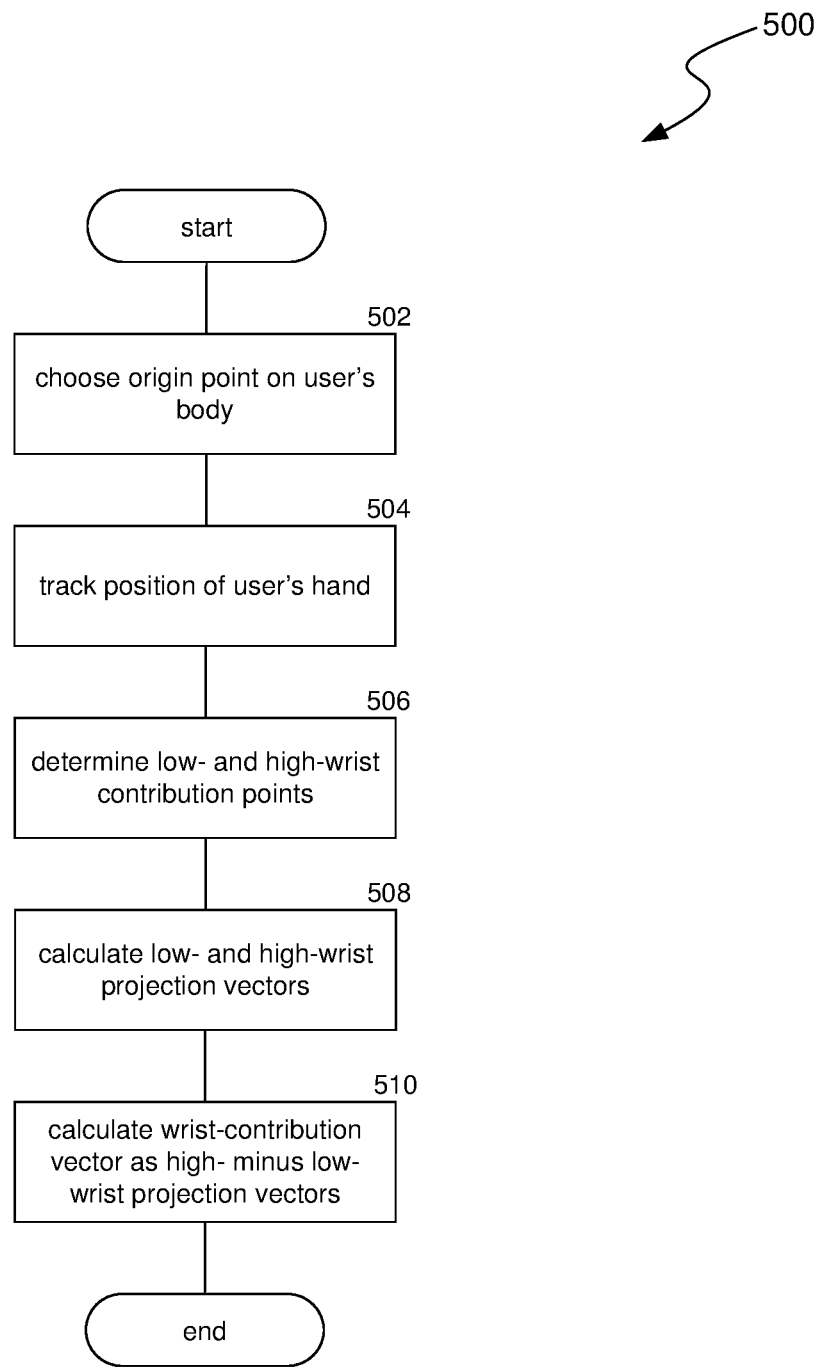
FIG. 5 is a flow diagram illustrating a process used in some implementations of the present technology for determining a user's wrist pose.

FIG. 5 is a flow diagram illustrating a process 500 used in some implementations for determining a user's wrist pose. In some implementations, process 500 can be performed "just in time," e.g., as a response to a user making a pointing gesture. In other situations, process 500 is re-run every few seconds or when the wrist moves more than a threshold position or orientation beyond its previous position or orientation. The results of process 500 can be used at block 610 of FIG. 6's process 600. Process 500 is exemplified by FIGS. 7A, 7B, and 8 and the accompanying discussion.

As background to the workings of process 500, a projection cast is a vector determined by a user's pointing gesture used to specify which objects the user wishes to interact with. While the projection cast is determined by outputs from the gesture-tracking system 434 of FIG. 4, the gesture-tracking system 434 may introduce inaccuracies due to imprecision in tracking positions and orientations and because of small motions at the user's hands and finger tips, relatively far removed from the user's body. To reduce the effects of these inaccuracies, a projection cast is determined as passing outward from a relatively stable "origin point" on the user's body through a "control point" on the user's hand or fingers.

Figure 7A:
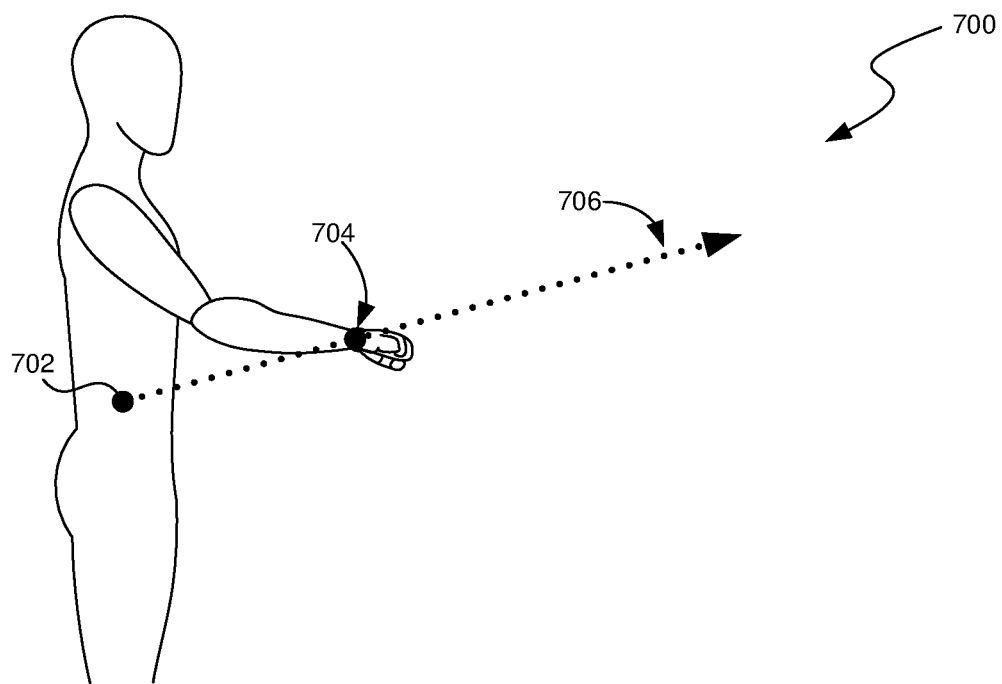
FIG. 7A is a conceptual diagram illustrating an example of projection casting from an origin point at the waist through a low-wrist contribution point.
Figure 7B:
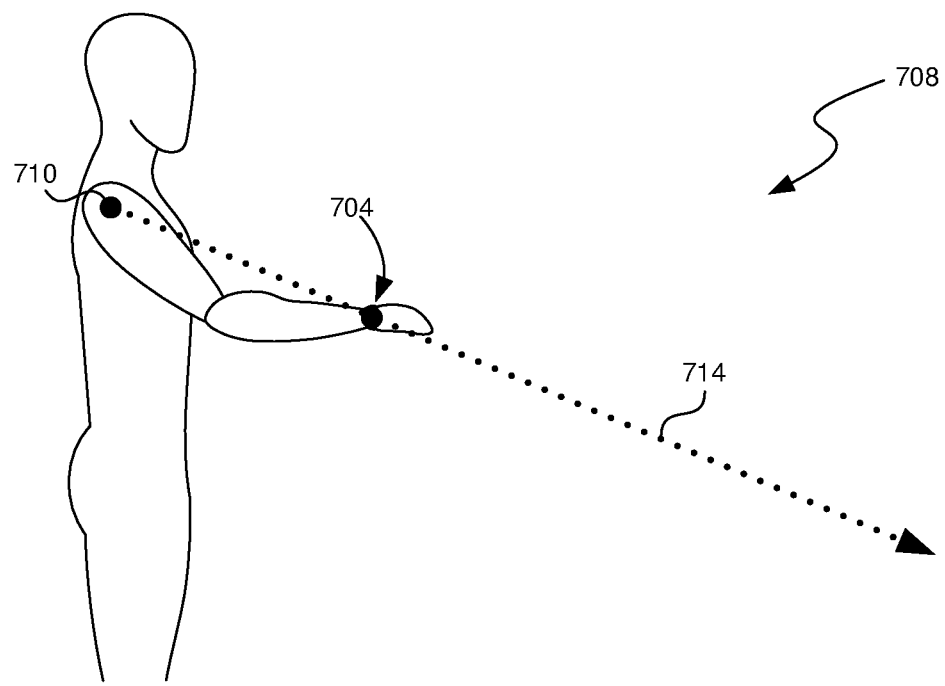
FIG. 7B is a conceptual diagram illustrating an example of projection casting from an origin point at the shoulder through a low-wrist contribution point.

At block 502, process 500 can use outputs from the body-position tracking system 436 and the gesture-tracking system 434 of FIG. 4 to choose an origin point on the user's body. FIGS. 7A and 7B and the accompanying text illustrate two different origin-point selections. In some variations, the origin point can be a tracked part of the user's body, such as a dominant eye, a hip, or a shoulder associated with a gesturing hand, a point between the hip and shoulder, etc. and the control point can be a part of the user's gesturing hand such as fingertips, a palm, a base of the wrist, or a fist. The origin point can be based on the user's current context such as what gesture the user is currently making or how far between the user's shoulder and hip based on where the user is directing her gaze. For example, process 500 can determine an angle above or below a plane level with the floor of the user's gaze and can select the origin point as a corresponding amount above a midpoint between the user's shoulder and hip if the gaze is below the plane and can select the origin point as a corresponding amount below the midpoint between the user's shoulder and hip if the gaze is above the plane. As a more specific example, process 500 can determine if the user's gaze is 0-45 degrees above the plane (with any gaze above 45 degrees being set to the 45 degree maximum), such as +27 degrees and set the origin point 27/45 or 60% of the way between the midpoint and the user's shoulder. Alternatively, process 500 can determine if the user's gaze is 0-45 degrees below the plane (with any gaze below 45 degrees being set to the 45 degree maximum), such as −18 degrees and set the origin point 18/45 or 40% of the way between the midpoint and the user's hip.

At block 504, process 500 tracks the position and orientation of the user's gesturing hand and fingers. As discussed above in relation to the gesture-tracking system 434, in some variations cameras in the user's HMD or other XR system perform this tracking. In some variations, the gesture-tracking system 434 precisely tracks the position and orientation in space of the user's hands, fingertips, and knuckles. In some variations, however, the gesture-tracking system 434 does not directly track the positions and orientations of the user's wrists with respect to her forearms or the rotation of her forearms.

Figure 8:
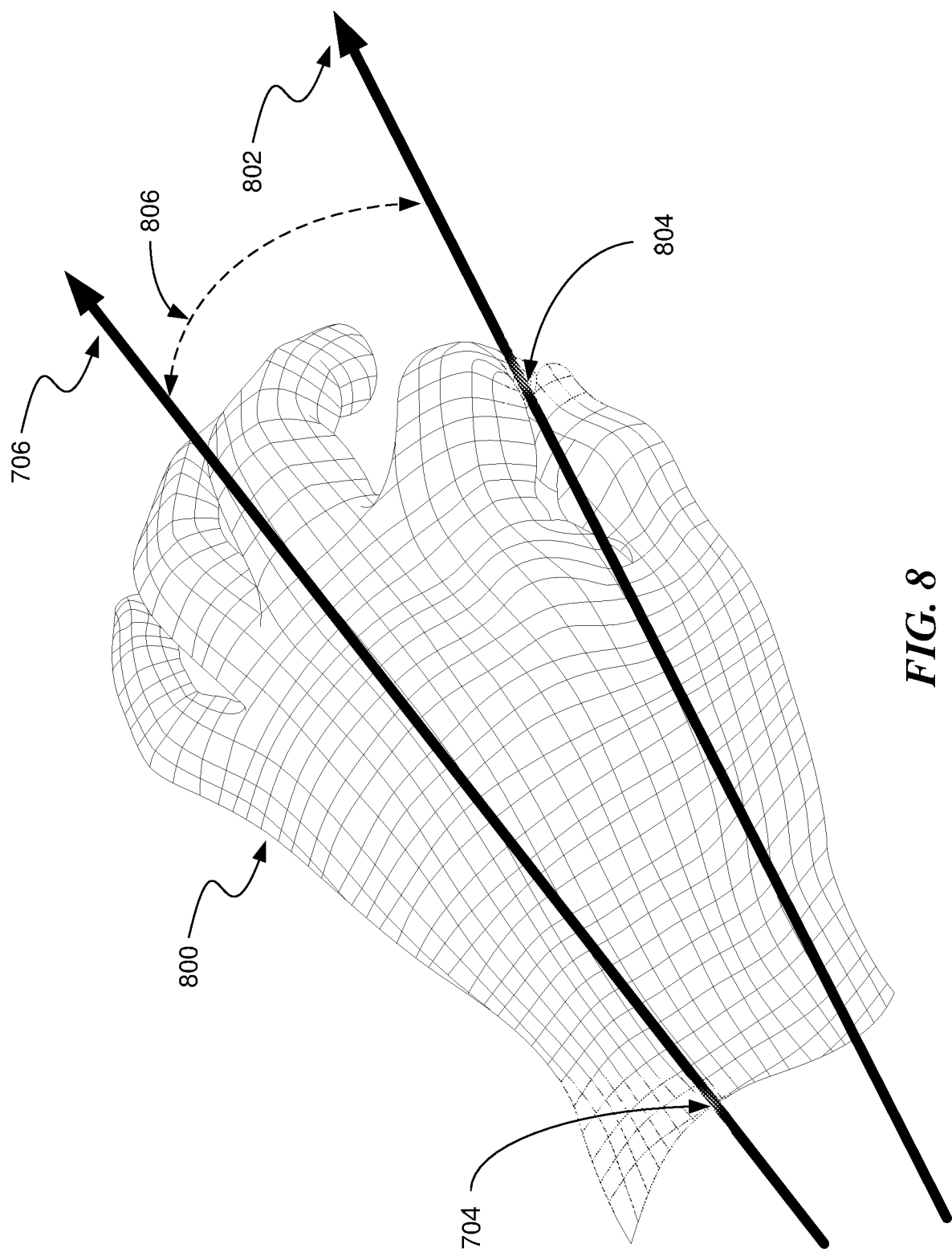
FIG. 8 is a conceptual diagram illustrating an example of determining a wrist contribution to projection casting.

At block 506, process 500 chooses low- and high-wrist contribution points on or near the user's tracked gesturing hand. The low-wrist contribution point is meant to be a point that is not much affected by the user moving her wrist through its three degrees of orientational freedom (pitch, yaw, and rotation). Process 500 can choose, as the low-wrist contribution point, a spot at the base of the wrist where it attached to the forearm, on the wrist's "top" side (when the palm is down). This low-wrist contribution point is illustrated in FIGS. 7B, 8, and 9.

Unlike with the low-wrist contribution point, process 500 picks a high-wrist contribution point that is strongly affected by the user's wrist orientation. When the user is making a pointing gesture (e.g., either by pointing a finger or making a pinch-pointing gesture), process 500 can pick the tip of the pointing finger or the user's pinch point as the high-wrist contribution point. The user's pinch point as the high-wrist contribution point is illustrated in FIGS. 8 and 9.

Having chosen the low- and high-wrist contribution points at block 506, process 500 at block 508 calculates two projection vectors. Each projection vector begins at the relatively stable (that is, relative to the stability of the low- and high-wrist contribution points) origin point set at block 502. Process 500 does this to increase the baseline of the projection cast eventually calculated by process 600 at block 610.

Process 500 calculates a low-wrist contribution vector as starting at the origin point and passing through the low-wrist contribution point determined at block 506. Similarly, process 500 calculates a high-wrist contribution vector as starting at the same origin point (or another origin point such as the base of the wrist) and passing through the high-wrist contribution point also determined at block 506. These two contribution vectors are illustrated in FIG. 8.

At block 510, process 500 subtracts the low-wrist projection vector from the high-wrist projection vector. The resulting vector delta is the wrist-contribution vector. It is shown as being calculated in FIG. 8 and as being used (at block 610 of FIG. 6) in FIG. 9.

In some variations, two other degrees of freedom of wrist motion, pitch and yaw, can be calculated by treating the low-wrist contribution pose as a wrist-neutral position, that is, the wrist orientation direction is assumed to continue the orientation direction set by the forearm, and the hand is palm down. Process 500 then determines the pitch and yaw as those required to rotate from the low-wrist contribution pose to the high-wrist contribution pose's forward direction.

Figure 6:
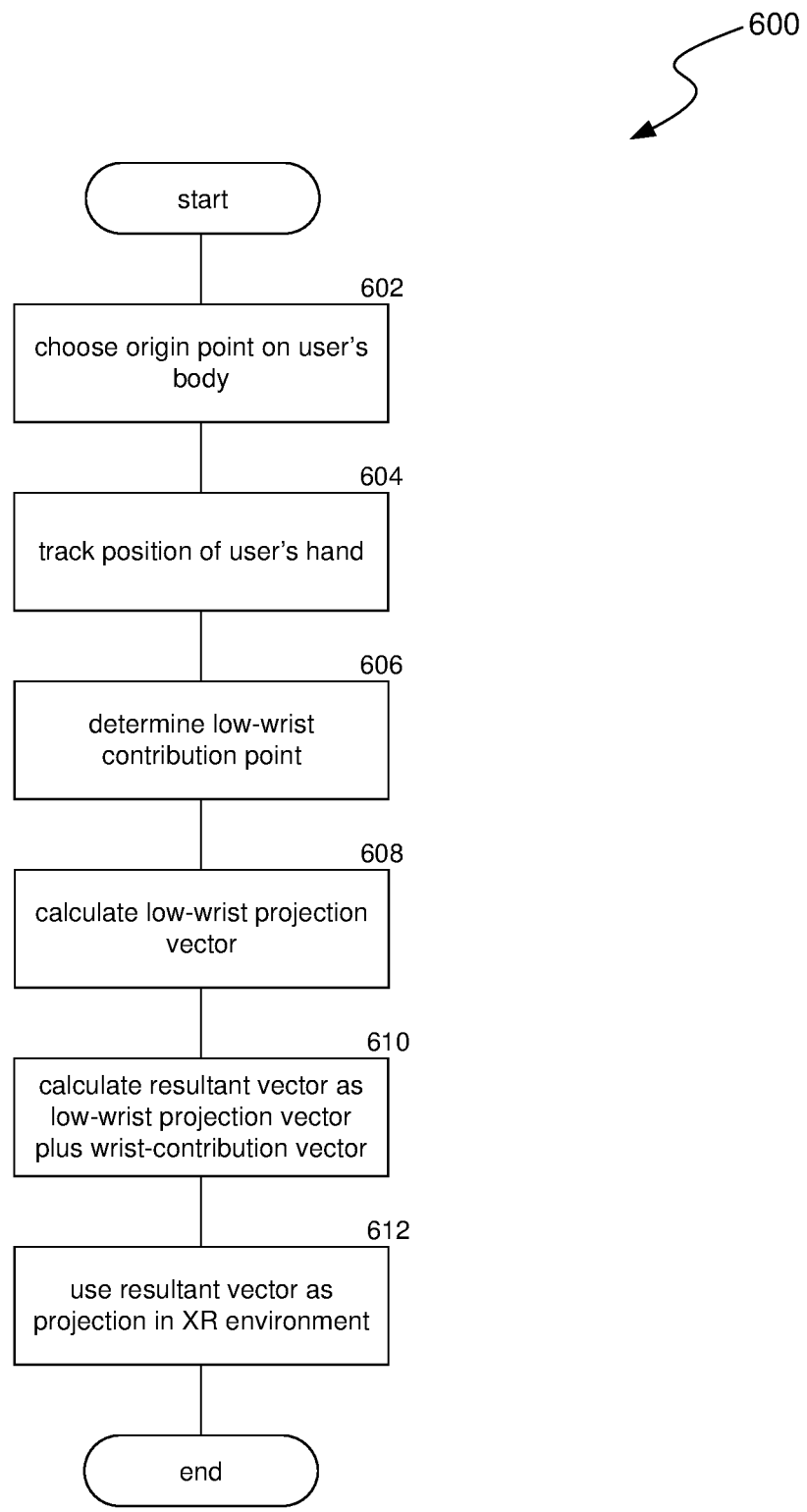
FIG. 6 is a flow diagram illustrating a process used in some implementations of the present technology for applying a previously determined wrist pose to stabilize a user's projection casting.

FIG. 6 is a flow diagram illustrating a process 600 used in some implementations for applying a previously calculated wrist-contribution vector to generate a projection casting and/or damp out jitter in the projection casting. In some implementations, process 600 can be performed "just in time," e.g., as a response to a user making a pointing gesture. Process 600 can run shortly after process 500 completes (e.g., within a second or so) and can use (at block 610) the results of process 500.

At block 602, process 600 chooses an origin point on the user's body. In doing this, process 600 applies the same techniques that process 500 uses at block 502 and that are discussed above. In some variations, the origin point chosen by process 600 is compared against the origin point chosen by process 500. If the two are not the same, then the wrist-contribution vector calculated by process 500 at block 510 is out-of-date and cannot be used. In that case, process 600 either ends or waits for process 500 to run again.

At block 604, process 600 tracks the current position of the user's hand using the same techniques as used by process 500 at block 504.

At block 606, process 600 determines a low-wrist contribution point on the user's hand using the same techniques as used by process 500 at block 506. This can be the same low-wrist contribution point determined at block 506 of FIG. 5. In some variations, paralleling the considerations discussed above in relation to block 602, the low-wrist contribution point chosen by process 600 is compared against the low-wrist contribution point chosen by process 500. If the two differ by more than a threshold amount, then the wrist-contribution vector calculated by process 500 at block 510 is out-of-date and cannot be used. In that case, process 600 either ends or waits for process 500 to run again.

The reason that process 600 may discard the previously calculated wrist-contribution vector at blocks 602 or 606 is that the user is always free to move her wrist intentionally. The wrist-pose isolation system as presented in the flow diagrams of FIGS. 5 and 6 is intended to damp out short term unintentional wrist jitter but is not meant to prevent the user's intentional wrist input to her projection casting.

At block 608, process 600 calculates a low-wrist projection vector from the origin point chosen at block 602 through the low-wrist contribution point determined at block 606. This block 608 uses the same calculation techniques as used at block 508 of FIG. 5 and discussed above. Process 600 need not calculate a high-wrist projection vector.

At block 610, process 600 calculates a resultant vector as the sum of the wrist-contribution vector calculated at block 510 by process 500 and the low-wrist projection vector calculated at block 608. In some implementations, at block 610, process 600 can compute a resultant vector by interpolate between the low and high wrist projection vectors from block 508. This interpolating can include applying an established weighting factor to each, e.g., weighting the low-wrist projection vector heavily and modifying it slightly by a lightly-weighted high-wrist projection vector. In some cases, the interpolating can further include a vector computed between the user's eye and the position of the pinch gesture. Because the resultant vector is calculated from the previously determined wrist-contribution vector of block 510 rather than an instantaneously calculated high-wrist projection vector, and/or because the high-wrist projection vector is weighted lightly, process 600 can dampen out jitter caused by unintentional small wrist motions in projections based on the resultant vector.

At block 612, process 600 uses the resultant vector calculated at block 610 as the user's projection cast. The projection cast can be extrapolated into the user's XR environment and used by the gesture-based user interface 440 of FIG. 4. That gesture-based user interface 440 can determine that objects that intersect with the projection cast are intended by the user to be selected for some interaction. In some variations, the specific type of interaction is determined by a gesture that the user makes at the time of the projection cast. Representative actions include, besides selecting one or more objects, moving an object, operating a control of an object, interacting with a menu presented by an object, and the like.

FIGS. 7A and 7B are conceptual diagrams illustrating two combinations of origin and control points. When process 500 at block 502 and process 600 at block 602 pick origin points on the user's body, they consider the user's current context in the XR environment. Different origin points can better support different user contexts. In the scenario 700 of FIG. 7A, for example, the user means to point at an object above the position of her hand. (This may be determined, for example, by a gaze-tracking system determining where she is looking.) In this scenario 700, a lower origin point 702 at her waist makes projection casting upward easier.

In contrast, the user in scenario 708 of FIG. 7B wishes to select an object below her hand. A good origin point for this scenario 708 is higher than in the scenario 700. Here, the origin point is set at her shoulder 710 in order to make projection casting downward easier.

In both FIGS. 7A and 7B, the process 500 at block 506 and the process 600 at block 606 determine the user's low-wrist contribution points. In both FIGS. 7A and 7B, the low-wrist contribution point is determined to be the base of the user's wrist 704 (i.e., the base of the user's hand).

From the respective origin points and then through the low-wrist contribution points, process 500 at block 508 and process 600 at block 608 draw the low-wrist projection vectors, here shown as 706 in FIG. 7A and 714 in FIG. 7B.

FIG. 8 is a conceptual diagram illustrating an example of determining a wrist contribution to projection casting. For example, FIG. 8 can show aspects of how process 500 calculates the wrist-contribution vector.

Not shown in FIG. 8, process 500 at block 502 can choose an origin point on the user's body (but see FIGS. 7A and 7B and accompanying text).

Using the results of the gesture-tracking system 434 of FIG. 4, process 500 at block 506 can determine the low-wrist contribution point as the base 704 of the user's wrist 800. From the chosen origin point and the determined low-wrist contribution point 704, process 500 at block 508 can calculate the low-wrist projection vector 706.

Again using the results of the gesture-tracking system 434 of FIG. 4, process 500 at block 506 can determine the high-wrist contribution point as the user's pinch-point 804. If the user had been pointing a finger rather than pinch-pointing, then process 500 could have determined the high-wrist contribution point as the tip of the user's pointing finger. From the chosen origin point and the determined high-wrist contribution point 804, process 500 at block 508 can calculate the high-wrist projection vector 802.

Process 500 at block 510 can subtract the low-wrist projection vector 706 from the high-wrist projection vector 802 to get the wrist-contribution vector 806 (identified in FIG. 8 by a difference arc) as the vector difference. The wrist-contribution vector 806 is stored for future use (in, for example, the scenario 900 of FIG. 9).

FIG. 9 is a conceptual diagram illustrating an example of combining vectors to generate a projection. For example, FIG. 9 can show aspects of how process 600 uses a previously determined wrist-contribution vector.

In the scenario 900 of FIG. 9, a user wishes to pinch-point to the upper-left corner 902 of a virtual menu object 904. Process 600 at block 602 can choose an origin point on the user's body (not shown in FIG. 9 but see FIGS. 7A and 7B and accompanying text). This can be the same origin point as chosen by the process 500 when it previously calculated the wrist-contribution vector.

Then using the results of the gesture-tracking system 434 of FIG. 4, process 600 at block 606 determines the low-wrist contribution point as the base 704 of the user's hand 800. Process 600 at block 608 calculates the low-wrist projection vector 706 as passing from the origin point through the low-wrist contribution point 704.

Assuming that the previously calculated wrist-contribution vector 806 is not out-of-date, process 600 at block 610 calculates the user's projection cast 906 as the sum of the low-wrist projection vector 706 and the wrist-contribution vector 806 calculated by process 500 at block 510. In some cases, these vectors can first be weighted by defined contribution amounts that control how much the wrist contribution vector should affect the projection vector when casting the projection.

The gesture-based user interface 440 of FIG. 4 then determines that the user's projection cast 906 intercepts the upper-left corner 902 of the virtual menu object 904. The user's pinch-pointing gesture is then interpreted according to the controls associated with that virtual menu object 904.

FIG. 9 also illustrates 2DoF in the user's wrist: pitch 908 and roll 910 (not illustrated is the third DoF: yaw). As long as the wrist's motions are less than a set threshold amount, these motions are considered jitter and are dampened out by the wrist-pose isolation system using the methods of processes 500 and 600 as described above. If, on the other hand, the user intends to change her projection cast so that it intercepts with, say, the virtual menu object 912, then she moves her wrist more than the threshold amount. The wrist-pose isolation system notes this and can recalculate the wrist contribution vector following a threshold change in the control points.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for interacting with objects in an artificial reality environment, the method comprising:
    tracking portions of a user's hand;
    determining, from the tracked portions of the user's hand, a low-wrist contribution point on the user's hand;
    determining, from the tracked portions of the user's hand, a high-wrist contribution point on the user's hand;
    calculating a low-wrist projection vector based on the low-wrist contribution point on the user's hand;
    calculating a high-wrist projection vector based on the high-wrist contribution point on the user's hand;
    calculating a resultant projection vector by interpolating between the low-wrist projection vector and the high-wrist projection vector; and
    casting a projection ray, in the artificial reality environment, along the direction of the resultant projection vector.

2. The method of claim 1, wherein the interpolating between the low-wrist projection vector and the high-wrist projection vector comprises:
    weighting each of the low-wrist projection vector and the high-wrist projection vector according to contribution factors pre-defined for each; and
    combining the weighted low-wrist projection vector and the high-wrist projection vector.

3. The method of claim 1, further comprising:
    determining a second low-wrist projection vector based on an updated position of the low-wrist contribution point on the user's hand; and
    resultant projection vector based on the second low-wrist projection vector.

4. The method of claim 1, wherein the high-wrist contribution point is at a pinch point between the user's thumb and index finger or at a tip of a finger of the user.

5. The method of claim 1, wherein the low-wrist contribution point on the user's hand is at a base of a wrist of the user.

6. The method of claim 1, wherein the projection ray is used to perform an action including one or more of: selecting one or more objects, moving one or more objects, operating a control assigned to an object, interacting with a menu presented by an object, or any combination thereof.

7. The method of claim 1, wherein the low-wrist projection vector and the high-wrist projection vector are each further based on an origin point on the body of the user that is a point between a shoulder and a hip of the user.

8. The method of claim 1,
    wherein the low-wrist projection vector and the high-wrist projection vector are each further based on an origin point on the body of the user that is a point between a shoulder and a hip of the user; and
    wherein the point between the shoulder and the hip of the user is selected according to a determined angle of the user's gaze.

9. A non-transitory computer-readable storage medium storing instructions that, when executed by a computing system, cause the computing system to perform a process for casting a projection in an artificial reality environment, the process comprising:
    tracking portions of a user's hand;
    determining, from the tracked portions of the user's hand, a low-wrist contribution point on the user's hand;
    determining, from the tracked portions of the user's hand, a high-wrist contribution point on the user's hand;
    calculating a low-wrist projection vector based on the low-wrist contribution point on the user's hand;
    calculating a high-wrist projection vector based on the high-wrist contribution point on the user's hand;
    calculating a resultant projection vector by interpolating between the low-wrist projection vector and the high-wrist projection vector; and
    casting a projection ray, in the artificial reality environment, along the direction of the resultant projection vector.

10. The non-transitory computer-readable storage medium of claim 9, wherein the interpolating between the low-wrist projection vector and the high-wrist projection vector comprises:
    weighting each of the low-wrist projection vector and the high-wrist projection vector according to contribution factors pre-defined for each; and
    combining the weighted low-wrist projection vector and the high-wrist projection vector.

11. The non-transitory computer-readable storage medium of claim 9, wherein the interpolating between the low-wrist projection vector and the high-wrist projection vector comprises:
    determining a gaze vector between an eye of the user and the high-wrist contribution point; and
    combining the low-wrist projection vector, the high-wrist projection vector, and the gaze vector.

12. The non-transitory computer-readable storage medium of claim 9, wherein the high-wrist contribution point is at a pinch point between the user's thumb and index finger or at a tip of a finger of the user.

13. The non-transitory computer-readable storage medium of claim 9, wherein the low-wrist contribution point on the user's hand is at a base of a wrist of the user.

14. The non-transitory computer-readable storage medium of claim 9, wherein the projection ray is used to perform an action including one or more of: selecting one or more objects, moving one or more objects, operating a control assigned to an object, interacting with a menu presented by an object, or any combination thereof.

15. The non-transitory computer-readable storage medium of claim 9, wherein the low-wrist projection vector and the high-wrist projection vector are each further based on an origin point on the body of the user that is a point between a shoulder and a hip of the user.

16. The non-transitory computer-readable storage medium of claim 9,
wherein the low-wrist projection vector and the high-wrist projection vector are each further based on an origin point on the body of the user that is a point between a shoulder and a hip of the user; and
wherein the point between the shoulder and the hip of the user is selected according to a determined angle of the user's gaze.

17. A computing system for interacting with objects in an artificial reality environment, the computing system comprising:
one or more processors; and
one or more memories storing instructions that, when executed by the one or more processors, cause the computing system to perform a process comprising:
tracking portions of a user's hand;
determining, from the tracked portions of the user's hand, a low-wrist contribution point on the user's hand;
determining, from the tracked portions of the user's hand, a high-wrist contribution point on the user's hand;
calculating a low-wrist projection vector based on the low-wrist contribution point on the user's hand;
calculating a high-wrist projection vector based on the high-wrist contribution point on the user's hand;
calculating a resultant projection vector by interpolating between the low-wrist projection vector and the high-wrist projection vector; and
casting a projection ray, in the artificial reality environment, along the direction of the resultant projection vector.

18. The computing system of claim 17, wherein the interpolating between the low-wrist projection vector and the high-wrist projection vector comprises:
weighting each of the low-wrist projection vector and the high-wrist projection vector according to contribution factors pre-defined for each; and
combining the weighted low-wrist projection vector and the high-wrist projection vector.

19. The computing system of claim 17, wherein the interpolating between the low-wrist projection vector and the high-wrist projection vector comprises:
determining a gaze vector between an eye of the user and the high-wrist contribution point; and
combining the low-wrist projection vector, the high-wrist projection vector, and the gaze vector.

20. The computing system of claim 17,
wherein the high-wrist contribution point is at a pinch point between the user's thumb and index finger or at a tip of a finger of the user; and
wherein the low-wrist contribution point on the user's hand is at a base of a wrist of the user.

* * * * *